United States Patent
Hao et al.

(10) Patent No.: US 9,544,818 B2
(45) Date of Patent: Jan. 10, 2017

(54) METHOD AND SYSTEM FOR DETERMINING QOS OF WLAN SERVICE IN BACKHAUL NETWORK

(71) Applicant: ZTE CORPORATION, Shenzhen, Guangdong Province (CN)

(72) Inventors: Li Hao, Shenzhen (CN); Tao Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/411,786

(22) PCT Filed: Sep. 17, 2013

(86) PCT No.: PCT/CN2013/083627
§ 371 (c)(1),
(2) Date: Dec. 29, 2014

(87) PCT Pub. No.: WO2014/067355
PCT Pub. Date: May 8, 2014

(65) Prior Publication Data
US 2015/0237531 A1 Aug. 20, 2015

(30) Foreign Application Priority Data
Oct. 31, 2012 (CN) .......................... 2012 1 0428633

(51) Int. Cl.
*H04W 28/24* (2009.01)
*H04W 72/08* (2009.01)
(Continued)

(52) U.S. Cl.
CPC ............. *H04W 28/24* (2013.01); *H04W 72/08* (2013.01); *H04L 5/00* (2013.01); *H04L 12/26* (2013.01); *H04W 84/12* (2013.01)

(58) Field of Classification Search
None
See application file for complete search history.

(56) References Cited

U.S. PATENT DOCUMENTS

2004/0165563 A1* 8/2004 Hsu ....................... H04W 48/18
370/338
2004/0176024 A1* 9/2004 Hsu ....................... H04L 12/189
455/3.04
(Continued)

FOREIGN PATENT DOCUMENTS

CN 101296517 A 10/2008
CN 101640952 A 2/2010
(Continued)

*Primary Examiner* — Kodzovi Acolatse
(74) *Attorney, Agent, or Firm* — Ling Wu; Stephen Yang; Ling and Yang Intellectual Property

(57) ABSTRACT

A method and system for determining a QoS of a WLAN service in a backhaul network are disclosed. The method includes: distinguishing whether a WLAN service or a WLAN instruction is to be returned, if the WLAN service is to be returned, recording a QoS of the WLAN service in a WLAN; and according to a preset mapping relation between the QoS of the WLAN service in the WLAN and a QoS of an ordinary service in the backhaul network, obtaining a QoS corresponding to a WLAN backhaul service in the backhaul network.

12 Claims, 2 Drawing Sheets

(51) Int. Cl.
*H04W 84/12* (2009.01)
*H04L 12/26* (2006.01)
*H04L 5/00* (2006.01)

(56) References Cited

U.S. PATENT DOCUMENTS

| | | | | |
|---|---|---|---|---|
| 2004/0205158 | A1* | 10/2004 | Hsu | H04W 48/18 709/218 |
| 2005/0135317 | A1* | 6/2005 | Ware | H04W 72/005 370/338 |
| 2006/0203778 | A1* | 9/2006 | Han | H04W 72/1257 370/335 |
| 2007/0179689 | A1* | 8/2007 | Soulie | H04W 36/32 701/19 |
| 2013/0308447 | A1* | 11/2013 | Cheng | H04W 74/02 370/230 |

FOREIGN PATENT DOCUMENTS

| | | |
|---|---|---|
| CN | 103167562 A | 6/2013 |
| EP | 1843530 A2 | 10/2007 |
| WO | 2006137705 A1 | 12/2006 |
| WO | WO2011/162781 A1 | 12/2011 |

\* cited by examiner

METHOD AND SYSTEM FOR
DETERMINING QOS OF WLAN SERVICE IN
BACKHAUL NETWORK

TECHNICAL FIELD

The present document relates to the Wireless Local Area Network (WLAN) backhaul technology, and particularly, to a method and system for determining a Quality of Service (QoS) of a WLAN service in a backhaul network.

BACKGROUND OF THE RELATED ART

In recent years, the WLAN technology has experienced unprecedented development, and compared to characteristics such as inconvenient construction and high costs of a wired network, the deployment of WLAN is very flexible, which is widely used in various scenarios such as at home, office area and public places and so on.

However, the traditional deployment of WLAN requires a wired backhaul, but with regard to certain places where the WLAN cannot be deployed, such as in running vehicles, due to the mobility characteristic thereof, the wired transmission cannot be implemented at all, and the user demands for WLAN cannot be satisfied. In order to solve this problem, a WLAN wireless backhaul way is introduced in the related art. In the wireless backhaul way, mobile networks such as the 3rd-Generation (3G) mobile communication network or the Long Term Evolution (LTE) network can be used as wireless backhaul networks of the WLAN, and data of the WLAN at an Access Point (AP) are used as terminal data of the backhaul networks to be transmitted to a mobile backhaul network. A schematic diagram of the WLAN wireless backhaul way is as shown in FIG. 1.

In the 3rd Generation Partnership Project (3GPP) protocol, all services in the 3G or LTE system should have their own QoS properties. Therefore, it is required to develop a set of methods for determining QoS properties for the backhaul services of the WLAN, so as to satisfy the transmission demands of the WLAN in the 3G or LTE network.

SUMMARY OF THE INVENTION

The example of the present document provides a method and system for determining a QoS of a WLAN service in a backhaul network, to solve the technical problem how to customize QoS properties for WLAN services in the backhaul network.

The example of the present document provides a method for determining a Quality of Service (QoS) of a Wireless Local Area Network (WLAN) service in a backhaul network, which comprises:

distinguishing whether a WLAN service or a WLAN instruction is to be returned, if the WLAN service is to be returned, recording a QoS of the WLAN service in a WLAN; and according to a preset mapping relation between the QoS of the WLAN service in the WLAN and a QoS of an ordinary service in the backhaul network, obtaining a QoS corresponding to a WLAN backhaul service in the backhaul network.

Alternatively, if multiple kinds of WLAN services to be returned exist, recording the QoS of the WLAN service in the WLAN comprises:

acquiring QoSs of all WLAN services to be returned in the WLAN;

performing comprehensive assessment on all the acquired QoSs, wherein the comprehensive assessment includes: summing, averaging or seeking an extreme value; and recording a comprehensive assessment result.

Alternatively, if multiple kinds of QoS properties of the WLAN service exist, recording the QoS of the WLAN service in the WLAN comprises:

acquiring QoSs of the WLAN service under all properties;

performing negotiation on the acquired QoSs of the WLAN service under all the properties, and obtaining a negotiated QoS; and recording the negotiated QoS as a QoS of a WLAN service to be returned in the WLAN.

Alternatively, the method further comprises:

if the WLAN instruction is to be returned, directly defining a QoS corresponding to a WLAN backhaul instruction in the backhaul network.

The example of the present document further provides a system for determining a Quality of Service (QoS) of a Wireless Local Area Network (WLAN) service in a backhaul network, which comprises: a QoS recording module and a service QoS conversion module, wherein the QoS recording module is configured to: distinguish whether a WLAN service or a WLAN instruction is to be returned; if the WLAN service is to be returned, record a QoS of the WLAN service in a WLAN; and send the recorded QoS to the service QoS conversion module; and the service QoS conversion module is configured to: according to a preset mapping relation between the QoS of the WLAN service in the WLAN and a QoS of an ordinary service in the backhaul network, convert the received QoS into a QoS corresponding to a WLAN backhaul service in the backhaul network.

Alternatively, the QoS recording module is configured to record the QoS of the WLAN service in the WLAN in the following way:

when multiple kinds of WLAN services to be returned exist, acquiring QoSs of all WLAN services to be returned in the WLAN; performing comprehensive assessment on all the acquired QoSs, wherein the comprehensive assessment includes: summing, averaging or seeking an extreme value; and recording a comprehensive assessment result.

Alternatively, the QoS recording module is configured to record the QoS of the WLAN service in the WLAN in the following way:

when multiple kinds of QoS properties of the WLAN service exist, acquiring QoSs of the WLAN service under all properties; performing negotiation on the acquired QoSs of the WLAN service under all the properties, and obtaining a negotiated QoS; and recording the negotiated QoS as a QoS of a WLAN service to be returned in the WLAN.

Alternatively, the system further comprises an instruction QoS conversion module, wherein the QoS recording module is further configured to: when determining that the WLAN instruction is to be returned, record the WLAN instruction; and send the recorded WLAN instruction to the instruction QoS conversion module; and the instruction QoS conversion module is configured to: directly define a QoS corresponding to a WLAN backhaul instruction in the backhaul network.

In the above technical scheme of the example of the present document, a mechanism for determining the QoS of the WLAN backhaul service in the backhaul network is provided, so that the transmission quality of the WLAN backhaul service in the backhaul network is guaranteed.

PREFERRED EMBODIMENTS OF THE PRESENT DOCUMENT

The examples of the present document will be described in detail in combination with the accompanying drawings below. It should be noted that the examples in the present document and the characteristics in the examples can be optionally combined with each other in the condition of no conflict.

Figure 1:
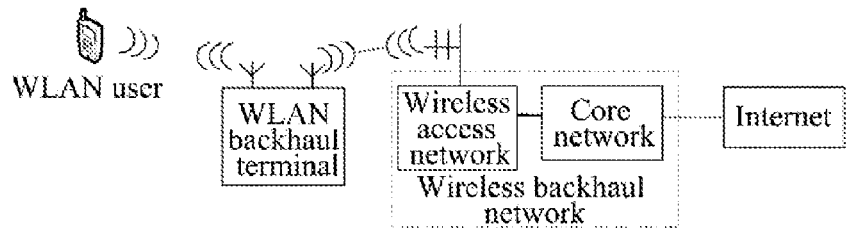
FIG. 1 is a schematic diagram of the WLAN wireless backhaul way.
Figure 2:
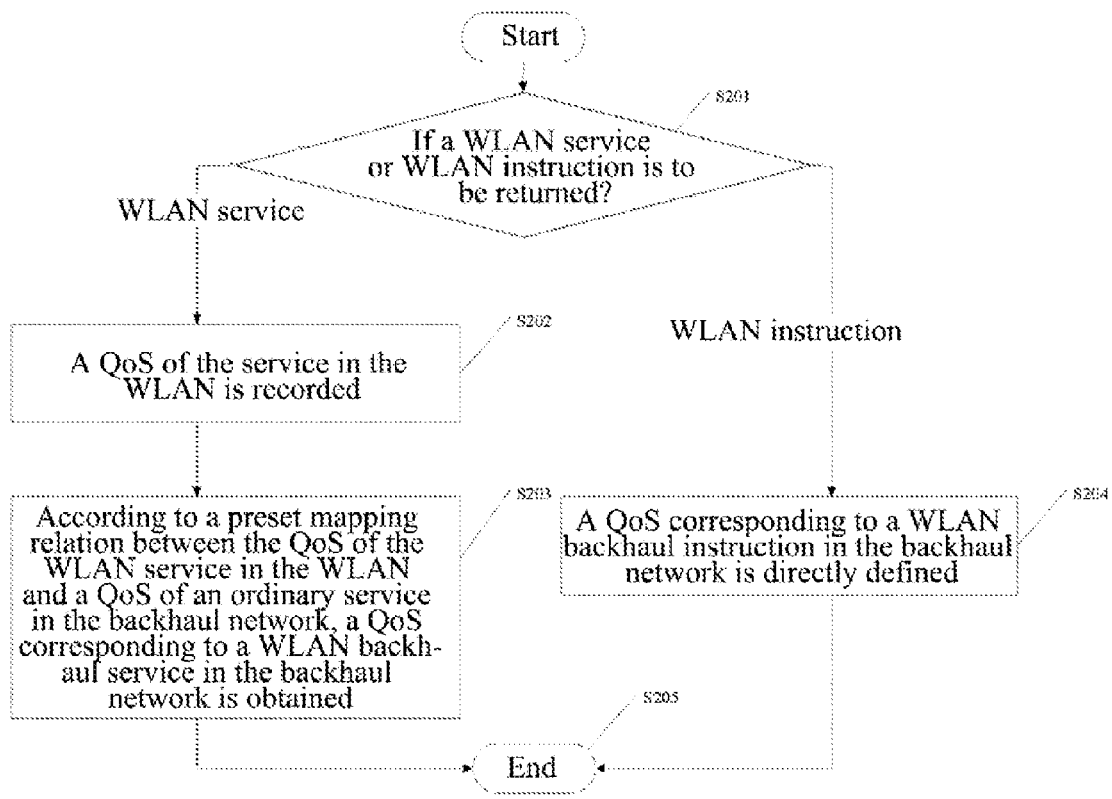
FIG. 2 is a flow diagram of the method for determining the QoS of the WLAN service in the backhaul network according to the example of the present document.

FIG. 2 is a flow diagram of the method for determining the QoS of the WLAN service in the backhaul network according to the example, and the following steps are included.

In step S201, it is distinguished whether a WLAN service or a WLAN instruction is to be returned, if the WLAN service is to be returned, step S202 is executed; and if the WLAN instruction is to be returned, step S204 is executed.

In step S202, a QoS of the WLAN service in the WLAN is recorded.

Multiple kinds of QoS parameters of the WLAN can be included, and the skilled person in the art can make a selection according to the actual needs.

when multiple kinds of WLAN services to be returned exist, QoSs of all WLAN services to be returned in the WLAN are acquired; a comprehensive assessment is performed on all the acquired QoSs, wherein the comprehensive assessment includes: summing, averaging or seeking an extreme value; and a comprehensive assessment result is taken as a final QoS of the WLAN service in the WLAN;

when multiple kinds of QoS properties of the WLAN service exist, QoSs of the WLAN service under all properties are acquired; a negotiation is performed on the acquired QoSs of the WLAN service under all the properties, and a negotiated QoS is obtained; and the negotiated QoS is recorded as a QoS of a WLAN service to be returned in the WLAN.

In step 203, according to a preset mapping relation between the QoS of the WLAN service in the WLAN and a QoS of an ordinary service in the backhaul network, a QoS corresponding to a WLAN backhaul service in the backhaul network is obtained; the step S205 is executed.

The backhaul networks can include a Time Division-Synchronization Code Division Multiple Access (TD-SCDMA) network, a Wideband Code Division Multiple Access (WCDMA) network, a CDMA2000 network and an LTE network.

In step 204, a QoS corresponding to a WLAN backhaul instruction in the backhaul network is directly defined.

In order to implement that the WLAN backhaul instruction and the WLAN backhaul service have respective and independent QoSs in the backhaul network, the QoS of the WLAN backhaul instruction and the QoS of the WLAN backhaul service are made in two different Radio Access Bearers (RABs).

In step S205, the flow ends.

According to the above determined QoS of the WLAN service in the backhaul network, the backhaul network can send the determined QoS to a corresponding unit so as to execute the QoS relevant algorithms in the process of establishing the backhaul service or the backhaul instruction.

The method of the above example will be described through 4 application examples below.

Example 1

In the WLAN, a fat AP is taken as an access point, and the TD-SCDMA network is used as the backhaul network of the WLAN.

The method for determining the QoS of the WLAN service in the backhaul network includes the following steps.

In step 1, QoS properties of the service accessing the WLAN are defined in the fat AP: a subscription priority of the WLAN user and a WLAN service type.

The subscription priority of the WLAN user is set as $0, 1, \ldots, N-1$, a total of N levels, N is a natural number, and different numbers represent different priority levels; and the WLAN service type is divided into K levels according to delay characteristics and rate demand characteristics of different services, and it is set as a service type $1, \ldots$, a service type K, K is a natural number.

In step 2, the fat AP records the subscription priority of the WLAN user and the WLAN service type of the service when executing service authentication or access service judgment for the WLAN user; and since the service includes two kinds of properties, the fat AP also needs to compare the recorded two kinds of properties and obtain one kind of QoS through negotiation.

The negotiated QoSs recorded by the fat AP with respect to all services accessing the WLAN currently are as shown in Table 1, in the table, a basic priority is a negotiated QoS of each access service, and a symbol * represents a numerical value.

TABLE 1

|  | User priority 0 | User priority 1 | User priority 2 | ... | User priority N − 1 |
|---|---|---|---|---|---|
| Service type 1 | Basic priority * | Basic priority * | Basic priority * |  | Basic priority * |
| Service type 2 | Basic priority * | Basic priority * | Basic priority * |  | Basic priority * |
| ... |  |  |  |  |  |
| Service type K | Basic priority * | Basic priority * | Basic priority * |  | Basic priority * |

In step 3, the fat AP performs comprehensive assessment on all the negotiated QoSs, and the comprehensive assessment ways include ways of summing, averaging or seeking a minimum value.

In step 4, the fat AP transfers a comprehensive assessment result to a core network in the TD-SCDMA network.

In step 5, according to a mapping relation between the QoS of the WLAN service in the WLAN and the QoS of the ordinary service in the backhaul network, the core network in the TD-SCDMA network obtains a QoS corresponding to the WLAN service in the backhaul network.

The mapping relation can be customized by each manufacturer.

In step 6, the core network in the TD-SCDMA network sends the obtained QoS corresponding to the WLAN service in the backhaul network to a Radio Network Controller (RNC) in a process of backhaul service establishment, and the RNC executes the QoS relevant algorithms, so as to guarantee the quality of service for the users.

Example 2

In the WLAN, a thin AP+AC (Access Controller) is taken as an access point, and the WCDMA network is used as the backhaul network of the WLAN.

The method for determining the QoS of the WLAN service in the backhaul network includes the following steps.

In step 1, QoS properties of the service accessing the WLAN are defined in the AC: a subscription priority of the WLAN user and a WLAN service type.

The subscription priority of the WLAN user is set as 0, 1, . . . , N−1, a total of N levels, N is a natural number, and different numbers represent different priority levels; and the WLAN service type is divided into K levels according to delay characteristics and rate demand characteristics of different services, and it is set as a service type 1, . . . , a service type K, K is a natural number.

In step 2, the AC records the subscription priority of the WLAN user and the WLAN service type of the service when executing service authentication or access service judgment for the WLAN user; and since the service includes two kinds of properties, the AC also needs to compare the recorded two kinds of properties and obtain one kind of QoS through negotiation.

In step 3, after the AC records the negotiated QoSs of all services accessing the WLAN currently, a comprehensive assessment is performed on all the negotiated QoSs, and the comprehensive assessment ways include ways of summing, averaging or seeking a minimum value.

In step 4, the AC transfers a comprehensive assessment result to a core network in the WCDMA network.

In step 5, according to a mapping relation between the QoS of the WLAN service in the WLAN and the QoS of the ordinary service in the WCDMA network, the WCDMA core network obtains a QoS corresponding to the WLAN service in the WCDMA network.

In step 6, the core network in the WCDMA network sends the obtained QoS corresponding to the WLAN service in the WCDMA network to an RNC in a process of backhaul service establishment, and the RNC executes the QoS relevant algorithms.

Example 3

The LTE network is used as the backhaul network of the WLAN, and the LTE network determines a QoS of the WLAN service of the LTE network itself.

The method for determining the QoS of the WLAN service in the backhaul network includes the following steps.

In step 1, QoS properties of the WLAN backhaul service are defined in a core network of the LTE network: a subscription priority of the WLAN user and a WLAN service type.

The subscription priority of the WLAN user is set as 0, 1, . . . , N−1, a total of N levels, N is a natural number, and different numbers represent different priority levels; and the WLAN service type is divided into K levels according to delay characteristics and rate demand characteristics of different services, and it is set as a service type 1, . . . , a service type K, K is a natural number.

In step 2, the core network of the LTE network records subscription priorities of the WLAN users, WLAN service types and basic priorities of all backhaul services in a process of WLAN backhaul service establishment.

In step 3, the core network of the LTE network performs comprehensive assessment on all the basic priorities, and the comprehensive assessment ways include ways of summing, averaging or seeking a minimum value.

In step 4, according to a mapping relation between the QoS of the WLAN service in the WLAN and the QoS of the ordinary service in the backhaul network, the core network of the LTE network converts a comprehensive assessment result into a QoS corresponding to the WLAN backhaul service in the LTE network.

In step 5, the core network of the LTE network sends the obtained QoS corresponding to the WLAN backhaul service in the LTE network to an Evolved Node B (E-Node B), and the E-Node B executes the QoS relevant algorithms.

Example 4

The CDMA2000 network is used as the backhaul network of the WLAN, and the CDMA2000 network determines a QoS of the WLAN instruction of the CDMA2000 network itself.

The method for determining the QoS of the WLAN instruction in the backhaul network includes the following steps.

In step 1, when a WLAN signaling is transmitted in the CDMA2000 backhaul network, it is identified by a core network of the CDMA2000 network, and after identifying that the WLAN instruction is transmitted, an RAB independent from the WLAN backhaul service is selected.

In step 2, in the selected RAB, the core network of the CDMA2000 network customizes QoS parameters of the WLAN backhaul signaling with respect to the WLAN backhaul signaling.

In step 3, the core network of the CDMA2000 network sends the QoS parameters of the backhaul signaling to a base station controller in a process of backhaul signaling transmission, and the base station controller executes the QoS relevant algorithms.

Figure 3:
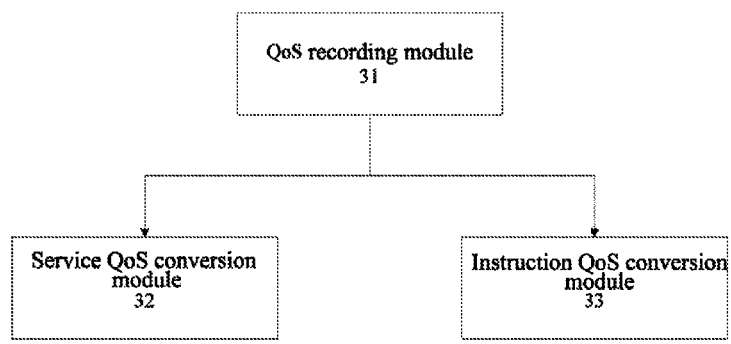
FIG. 3 is a module diagram of the system for determining the QoS of the WLAN service in the backhaul network according to the example of the present document.

FIG. 3 is a module diagram of the system for determining the QoS of the WLAN service in the backhaul network according to the example.

The system includes a QoS recording module 31 and a service QoS conversion module 32, wherein the QoS recording module 31 is used to: distinguish whether a WLAN service or a WLAN instruction is to be returned; if the WLAN service is to be returned, record a QoS of the WLAN service in a WLAN; and send the recorded QoS to the service QoS conversion module 32;

the QoS recording module 31 is used to record the QoS of the WLAN service in the WLAN in the following way: when multiple kinds of QoS properties of the WLAN service exist, acquiring QoSs of the WLAN service under all properties; performing negotiation on the acquired QoSs of the WLAN service under all the properties, and obtaining a negotiated QoS; and recording the negotiated QoS as a QoS of a WLAN service to be returned in the WLAN;

the QoS recording module 31 is used to record the QoS of the WLAN service in the WLAN in the following way: when multiple kinds of WLAN services to be returned exist, acquiring QoSs of all WLAN services to be returned in the WLAN; performing comprehensive assessment on all the acquired QoSs, wherein the comprehensive assessment includes: summing, averaging or seeking an extreme value;

recording a comprehensive assessment result; and sending the comprehensive assessment result to the service QoS conversion module 32; and the service QoS conversion module 32 is used to: according to a preset mapping relation between the QoS of the WLAN service in the WLAN and a QoS of an ordinary service in the backhaul network, convert the received QoS into a QoS corresponding to a WLAN backhaul service in the backhaul network.

The above system also includes an instruction QoS conversion module 33.

The QoS recording module 31 is also used to: when determining that the WLAN instruction is to be returned, record the WLAN instruction; and send the recorded WLAN instruction to the instruction QoS conversion module 33; and the instruction QoS conversion module 33 is used to: directly define a QoS corresponding to a WLAN backhaul instruction in the backhaul network.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The example of the present document is not limited to any combination of hardware and software in a specific form.

It should be noted that the present document can still have other various examples, the skilled familiar to the art can make various corresponding changes and transformations according to the example of the present document without departing from the spirit and essence of the present document, and these corresponding changes and transformations shall all fall into the protection scope of the appended claims of the present document.

INDUSTRIAL APPLICABILITY

With the method and system of the example of the present document, the transmission quality of the WLAN backhaul service in the backhaul network is guaranteed.

What is claimed is:

1. A method for determining a Quality of Service (QoS) of a Wireless Local Area Network (WLAN) service in a wireless backhaul network, comprising:
receiving, by the wireless backhaul network which is a mobile network, WLAN data sent from a WLAN used as terminal data of the wireless backhaul network;
determining, by the wireless backhaul network, whether the WLAN data needed to be returned is a WLAN service needed to be returned or a WLAN instruction needed to be returned;
if the WLAN data needed to be returned is the WLAN service, defining QoS property of the WLAN service, wherein the QoS property of the WLAN service comprises a subscription priority of a WLAN user and/or a WLAN service type, and determining a QoS of the WLAN service in the WLAN according to the QoS property of the WLAN service; and
according to a preset mapping relation between the QoS of the WLAN service in the WLAN and a QoS of an ordinary service in the wireless backhaul network, converting the QoS of the WLAN service in the WLAN into a QoS of the WLAN service in the wireless backhaul network;
wherein, the mobile network comprises a 3G mobile communication network or a Long Term Evolution (LTE) network.

2. The method according to claim 1, wherein
if multiple kinds of WLAN services needed to be returned exist, determining the QoS of the WLAN service in the WLAN comprises:
acquiring QoSs of all WLAN services needed to be returned in the WLAN;
performing a comprehensive assessment on all the acquired QoSs, wherein the comprehensive assessment includes: summing, averaging or seeking an extreme value; and
recording a comprehensive assessment result as a final QoS of the WLAN services in the WLAN.

3. The method according to claim 2, wherein
if multiple kinds of QoS properties of the WLAN service needed to be returned exist, determining the QoS of the WLAN service in the WLAN comprises:
recording all the QoSs properties of the WLAN service;
comparing all the QoS properties, and performing negotiation, to obtain a negotiated QoS; and
recording the negotiated QoS as a QoS of the WLAN service in the WLAN.

4. The method according to claim 2, further comprising:
if the WLAN data needed to be returned is the WLAN instruction, directly defining, by the wireless backhaul network, a QoS corresponding to the WLAN instruction in the wireless backhaul network.

5. The method according to claim 1, wherein
if multiple kinds of QoS properties of the WLAN service needed to be returned exist, determining the QoS of the WLAN service in the WLAN comprises:
recording all the QoSs properties of the WLAN service;
comparing all the QoS properties, and performing negotiation, to obtain a negotiated QoS; and
recording the negotiated QoS as a QoS of the WLAN service in the WLAN.

6. The method according to claim 1, further comprising:
if the WLAN data needed to be returned is the WLAN instruction, directly defining, by the wireless backhaul network, a QoS corresponding to the WLAN instruction in the wireless backhaul network.

7. A system for determining a Quality of Service (QoS) of a Wireless Local Area Network (WLAN) service in a backhaul network, comprising: an apparatus in a core network in a wireless backhaul network which is a mobile network, which comprises a processor and a memory, the memory having instructions executable by the processor to:
receive WLAN data sent from a WLAN used as terminal data of the wireless backhaul network;
determine whether the WLAN data needed to be returned is a WLAN service needed to be returned or a WLAN instruction is-needed to be returned;
if the WLAN data needed to be returned is the WLAN service, define QoS property of the WLAN service, wherein the QoS property of the WLAN service comprises a subscription priority of a WLAN user and/or a WLAN service type, and determine a QoS of the WLAN service in the WLAN according to the QoS property of the WLAN service; and
according to a preset mapping relation between the QoS of the WLAN service in the WLAN and a QoS of an ordinary service in the wireless backhaul network, convert the received QoS of the WLAN service in the WLAN into a QoS of the WLAN service in the wireless backhaul network;

wherein, the mobile network comprises a 3G mobile communication network or a Long Term Evolution (LTE) network.

8. The system according to claim 7, wherein
the QoS of the WLAN service in the WLAN is determined in a following way:
when multiple kinds of WLAN services needed to be returned exist, acquiring QoSs of all WLAN services needed to be returned in the WLAN;
performing a comprehensive assessment on all the acquired QoSs, wherein the comprehensive assessment includes: summing, averaging or seeking an extreme value; and
recording a comprehensive assessment result as a final QoS of the WLAN services in the WLAN.

9. The system according to claim 8, wherein
the QoS of the WLAN service in the WLAN is determined in a following way:
when multiple kinds of QoS properties of the WLAN service needed to be returned exist, recording all the QoSs properties of the WLAN service;
comparing all the QoS properties, and performing negotiation, to obtain a negotiated QoS; and
recording the negotiated QoS as a QoS of the WLAN service in the WLAN.

10. The system according to claim 8, the processor of the apparatus is further configured to: directly define a QoS corresponding to the WLAN instruction in the wireless backhaul network when the WLAN data needed to be returned is the WLAN instruction.

11. The system according to claim 7, wherein
the QoS of the WLAN service in the WLAN is determined in a following way:
when multiple kinds of QoS properties of the WLAN service needed to be returned exist, recording all the QoS properties of the WLAN service;
comparing all the QoS properties, and performing negotiation, to obtain a negotiated QoS; and
recording the negotiated QoS as a QoS of the WLAN service in the WLAN.

12. The system according to claim 7, the processor of the apparatus is further configured to: directly define a QoS corresponding to the WLAN instruction in the wireless backhaul network when the WLAN data needed to be returned is the WLAN instruction.

* * * * *